United States Patent
Constancias (10) Patent No.: US 10,923,319 B2
(45) Date of Patent: Feb. 16, 2021

(54) METHOD FOR PROJECTING A BEAM OF PARTICLES ONTO A SUBSTRATE WITH CORRECTION OF SCATTERING EFFECTS

(71) Applicant: COMMISSARIAT A L'ENERGIE ATOMIQUE ET AUX ENERGIES ALTERNATIVES, Paris (FR)

(72) Inventor: Christophe Constancias, Sarcenas (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/307,465

(22) PCT Filed: Jun. 6, 2017

(86) PCT No.: PCT/EP2017/063657
§ 371 (c)(1),
(2) Date: Dec. 5, 2018

(87) PCT Pub. No.: WO2017/215976
PCT Pub. Date: Dec. 21, 2017

(65) Prior Publication Data
US 2019/0304747 A1    Oct. 3, 2019

(30) Foreign Application Priority Data
Jun. 16, 2016    (FR) ...................... 16 55610

(51) Int. Cl.
*G03F 7/20* (2006.01)
*H01J 37/317* (2006.01)
(Continued)

(52) U.S. Cl.
CPC ........ *H01J 37/3175* (2013.01); *G03F 7/2059* (2013.01); *G03F 7/2061* (2013.01);
(Continued)

(58) Field of Classification Search
CPC ............... H01J 37/3171; H01J 37/3174; H01J 37/3175; H01J 2237/31776;
(Continued)

(56) References Cited

U.S. PATENT DOCUMENTS

2012/0314198 A1    12/2012   Lee et al.
2013/0030762 A1*   1/2013    Mercier ............... A61N 5/1031
                                                         702/179
2013/0201468 A1    8/2013    Manakli

FOREIGN PATENT DOCUMENTS

EP    2 650 902 A2    10/2013
JP    2005-338666 A   12/2005
WO    2015/028753 A1  3/2015

OTHER PUBLICATIONS

Bentabet, A., and N. E. Fenineche. "Backscattering coefficients for low energy electrons and positrons impinging on metallic thin films: scaling study." Applied Physics A 97.2 (2009): 425. (Year: 2009).*

(Continued)

*Primary Examiner* — Wyatt A Stoffa
(74) *Attorney, Agent, or Firm* — BakerHostetler (57) ABSTRACT

A method for projecting a particle beam onto a substrate, the method includes a step of calculating a correction of the scattering effects of the beam by means of a point spread function modelling the forward scattering effects of the particles; a step of modifying a dose profile of the beam, implementing the correction thus calculated; and a step of projecting the beam, the dose profile of which has been modified, onto the substrate, and being wherein the point spread function is, or comprises by way of expression of a linear combination, a two-dimensional double sigmoid function. A method to e-beam lithography is also provided.

8 Claims, 6 Drawing Sheets

(51) Int. Cl.
*G06F 30/20* (2020.01)
*G06F 111/08* (2020.01)

(52) U.S. Cl.
CPC .......... *H01J 37/3174* (2013.01); *G06F 30/20* (2020.01); *G06F 2111/08* (2020.01); *H01J 2237/31754* (2013.01); *H01J 2237/31769* (2013.01); *H01J 2237/31776* (2013.01); *H01J 2237/31777* (2013.01)

(58) Field of Classification Search
CPC ..... H01J 2237/2237; H01J 2237/31777; H01J 2237/31754; H01J 2237/31769; G03F 7/70558; G03F 7/2059
See application file for complete search history.

(56) References Cited

OTHER PUBLICATIONS

Frujinoiu, C., and R. R. Brey. "A Monte Carlo investigation of electron backscattering." Radiation protection dosimetry 97.3 (2001): 223-229. (Year: 2001).*
Poonawala, et al., "Mask Design for Optical Microlithography—An Inverse Imaging Problem", IEEE Transactions on Image Processing, vol. 16, Issue: 3, pp. 774-788, Mar. 2007.

* cited by examiner

METHOD FOR PROJECTING A BEAM OF PARTICLES ONTO A SUBSTRATE WITH CORRECTION OF SCATTERING EFFECTS

CROSS-REFERENCE TO RELATED APPLICATIONS

This application is a National Stage of International patent application PCT/EP2017/063657, filed on Jun. 6, 2017, which claims priority to foreign French patent application No. FR 1655610, filed on Jun. 16, 2016, the disclosures of which are incorporated by reference in their entirety.

FIELD OF THE INVENTION

The invention relates to a method for projecting a beam of particles, in particular of electrons, onto a substrate, and to a computer-program product for implementing such a method. It in particular applies to the field of e-beam lithography for direct etching on wafers or manufacture of masks, but also to e-beam microscopy and more generally to any field in which it is necessary to model and control the interaction of a beam of particles (electrons, but also ions, or even neutral atoms) with a target.

BACKGROUND

E-beam lithography (or electron-beam lithography) is the most widely used maskless—or "direct write"—lithography technique. It allows a spatial resolution of a few tens of nanometers or less to be achieved and is particularly well suited to the manufacture of photolithography masks.

Figure 1:
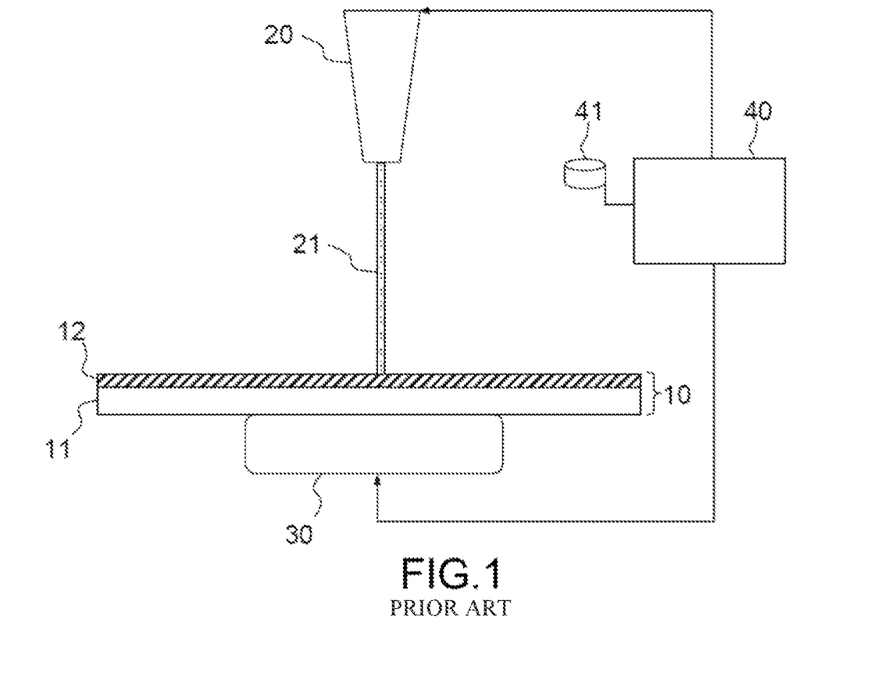
FIG. 1, a schematic representation of an e-beam lithography apparatus.

FIG. 1 is a schematic illustration of a known prior-art e-beam lithography apparatus suitable for implementing a method according to the invention. In this figure, the reference 11 corresponds to a substrate—for example a silicon wafer or a sheet of glass or silica—to which a pattern must be transferred by direct writing, the reference 12 to a layer of resist that is sensitive to irradiation by the electron beam and that is deposited on a surface of said substrate (the term "substrate" will be used both to refer to the bare substrate 11 and to the assembly 10 including the resist layer), the reference 20 to an e-beam source, the reference 21 to an electron beam generated by said source and directed toward the substrate, the reference 30 to a translational stage allowing the substrate 10 to be moved with respect to the electron beam 20, and the reference 40 to a computer or a processor for controlling the e-beam source 20 and the translational stage 30. The e-beam source 20 and the translational stage 30 interact to selectively expose specific regions of the substrate to the electron beam, in a preset pattern.

Zones of the resist that have received a dose D (measured, for example in $\mu C/cm^2$) higher than or equal to a threshold $D_0$ undergo a chemical transformation—they are said to have been exposed.

Next, in what is called a development step, the exposed zones of the resist (if the latter is of "positive" type) are selectively removed, so that the regions in which the resist is removed reproduce the preset pattern on the surface of the substrate. In the case of what is called a "negative" resist, in contrast, it is the unexposed zones that are removed during the development, such that it is the resist remaining on the surface of the substrate that reproduces the pattern.

The electron beam 21 may be a beam of narrow circular cross section, in which case the pattern is projected onto the substrate point by point. However, in industrial applications it is often preferable to use what are called "shaped" beams that have a larger area and a generally rectangular or triangular shape. A shaped beam allows an elementary shape of the pattern to be transferred to be produced in a single exposure. A significant acceleration of the process is achieved thereby.

In fact, it is known that the spatial distribution of the charge and energy deposited on the substrate (the "dose") is affected by the effects of interaction between the electrons of the beam and the target-substrate, and in particular by the effects of forward scattering and backscattering ("proximity effects"). More precisely, because of proximity effects, the dose actually received by the surface of the substrate does not drop abruptly to zero on the edges of the spot of the beam, but decreases gradually. Furthermore, scattering widens the dose distribution beyond the theoretical limits of the spot of the incident beam; in particular, backscattered electrons may move a distance of a few microns.

It is therefore essential to correct proximity effects to guarantee an exact reproduction of the target pattern on the substrate. This correction is made by modulating the dose delivered by the beam and/or by using a beam that is narrower than the pattern to be transferred to the substrate.

The calculation of the correction requires a mathematical model of the electron-substrate interaction, which is generally based on a point spread function (PSF). The distribution of the dose at the surface of the substrate is given by the convolution of the PSF and the "theoretical" shape of the electron beam (expressed, for example, by a rectangle function equal to 1 inside a rectangle and to 0 elsewhere).

Conventionally, the PSF is expressed by the weighted sum of two Gaussian distribution functions, one representing forward scattering and the other backscattering:

$$f(r) = \frac{1}{\pi(1+\eta)}\left(\frac{1}{\alpha^2}e^{-\frac{r^2}{\alpha^2}} + \frac{\eta}{\beta^2}e^{-\frac{r^2}{\beta^2}}\right) \quad (1)$$

where:
α is the width of the forward scattering;
β is the width of the backscattering;
η is the ratio of the intensities of the forward scattering and backscattering;
r is the radial position of a point with respect to the center of the beam.

The values of the parameters α, β and η are dependent on the energy of the electrons and on the nature of the substrate. They may be determined experimentally for a given method. See for example:

D. Rio, C. Constancias, M. Martin, B. Icard, J. van Nieuwstadt, J. Vijverberg, L. Pain "*5 kV multielectron beam lithography: MAPPER tool and resist process Characterization*", Journal of Vacuum Science and Technology B:Nanotechnology and Microelectronics Volume 28, N° 6, November 2010, Pages C6C14-C6C20; and F. Delachat, C. Constancias, J. Reche, B. Dal'Zotto, L. Pain, B. Le Drogoff, M. Chaker, J. Margot, "*Determination of spot size and acid diffusion length in positive chemically amplified resist for e-beam lithography at 100 and 5 kV*", Journal of Vacuum Science and Technology B: Nanotechnology and Microelectronics Volume 32, N° 6, 1 Nov. 2014.

It is also possible to simulate the electron-matter interaction, for example with a Monte-Carlo method, then to find the values of α, β and η that achieve the best fit between the analytical PSF given by equation (1) and the results of the simulation.

Typically for an acceleration voltage of about 50 kV and a target of silicon or of glass ($SiO_2$), α is about 30 nm, β about 10 µm and η about 0.5.

If however the dose distribution given by a PSF of this double-Gaussian type is compared with the dose distribution produced by a simulation using a Monte-Carlo model, significant discrepancies—generally quantified by error variances—are observed.

The direct use of the dose profiles calculated by Monte-Carlo simulations to correct the proximity effects may yield, at least in principle, almost ideal results, but the computation time required is much too long for most practical applications. Recourse to an analytical, and therefore necessarily approximate, expression of the PSF is therefore generally necessary.

Several research studies have been carried out in order to find analytical expressions of the PSF that give better results than the simple double Gaussian of equation (1) while being sufficiently simple to be used in practice. For example, it has been proposed to use a linear combination of more than two Gaussian distributions. Document EP 2 650 902 discloses the use of a PSF obtained by linear combination of Voigt functions (or functions approximating a Voigt function, such as a Pearson VII function) and, optionally, at least one Gaussian function.

None of these approaches has proved to be entirely satisfactory, in particular when it is a question of producing patterns having very small critical dimensions, of about a few tens of nanometers (the critical dimension is defined as the smallest dimension of a pattern, or of a portion of a pattern; for example, the width of the thinnest line of the pattern).

SUMMARY OF THE INVENTION

The invention aims to overcome the aforementioned drawbacks of the prior art. More precisely, it aims to provide an analytical expression of a PSF allowing a better correction of proximity effects than the known expressions of the prior art, in particular for the production of patterns having critical dimensions smaller than 100 nm, or even than 50 nm, while being simple to compute.

According to the invention, this aim is achieved by using a PSF expressed by a symmetric two-dimensional double sigmoid function. Such a function has the appearance of a rectangle function the edges of which are rounded. It may be expressed as the difference between two sigmoid functions that are identical but spatially offset.

One subject of the invention is therefore a method for projecting a particle beam onto a substrate, said method comprising
- a step of calculating a correction of the scattering effects of said beam by means of a point spread function modelling the forward scattering effects of said particles;
- a step of modifying a dose profile of said beam, implementing the correction thus calculated; and
- a step of projecting the beam, the dose profile of which has been modified, onto said substrate, and being characterized in that said point spread function is, or comprises by way of expression of a linear combination, a two-dimensional double sigmoid function.

Another subject of the invention is an e-beam lithography process comprising a step of projecting an electron beam onto a substrate covered with developable resist, said step being implemented as part of a method such as mentioned above.

Yet another subject of the invention is a computer program comprising program-code instructions stored on a computer-readable medium and suitable for implementing, when said program is executed by a computer, an operation for correcting scattering effects of a particle beam projected onto a substrate, said correction being carried out by means of a point spread function that is, or comprises by way of expression of a linear combination, a two-dimensional double sigmoid function.

BRIEF DESCRIPTION OF THE DRAWINGS

Other features, details and advantages of the invention will become apparent on reading the description given with reference to the appended drawings, which are given by way of example and which show, respectively.

DETAILED DESCRIPTION

Generally, a sigmoid function is a function that has two horizontal asymptotes, which pass gradually from one to the other and that have an inflection point. In a more restricted sense, this term designates the function $$S(x) = \frac{1}{1 + e^{-(x-x_0)/k}} \quad (2)$$

which is also called the logistic function.

Figure 2:
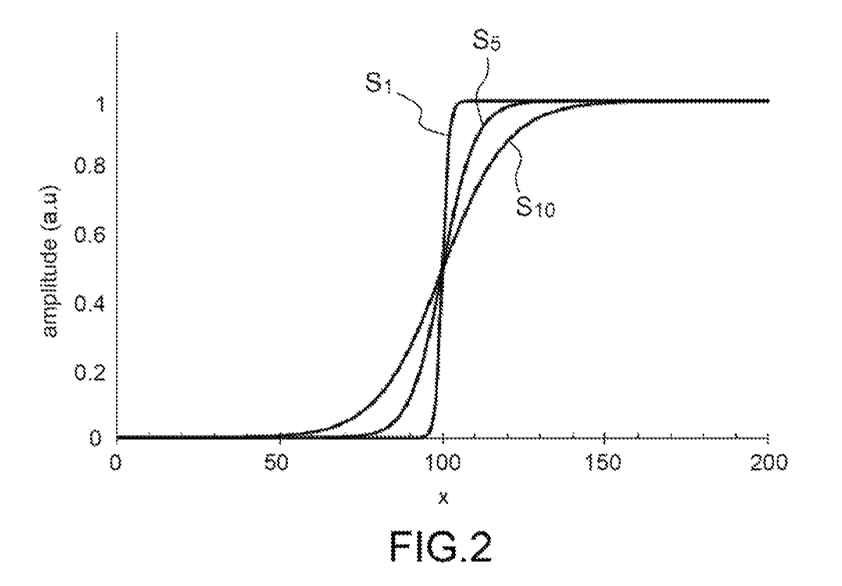
FIG. 2, graphs of three sigmoid functions characterized by different steepness parameters.

Function (2) depends on two parameters: $x_0$, which determines the position of the inflection point, and k, which determines the steepness of the transition region between the two asymptotes (more precisely, 1/k is the value of the derivative of S(x) at the inflection point $x=x_0$). FIG. 2 shows graphs of three logistic curves with $x_0=100$ and k=1 (curve $S_1$), k=5 (curve $S_5$) and k=10 (curve $S_{10}$).

A double sigmoid function is given by the difference between two sigmoid functions of the type of equation (2). In particular, if the difference between two sigmoid functions having the same parameter k and parameters $x_0$ of same absolute value but opposite sign is calculated, a function is obtained that is what may be called a symmetric sigmoid function DSS:

$$DSS(x) = \frac{1}{1 + e^{-(x+x_0)/k}} - \frac{1}{1 + e^{-(x-x_0)/k}} \quad (3)$$

Figure 3:
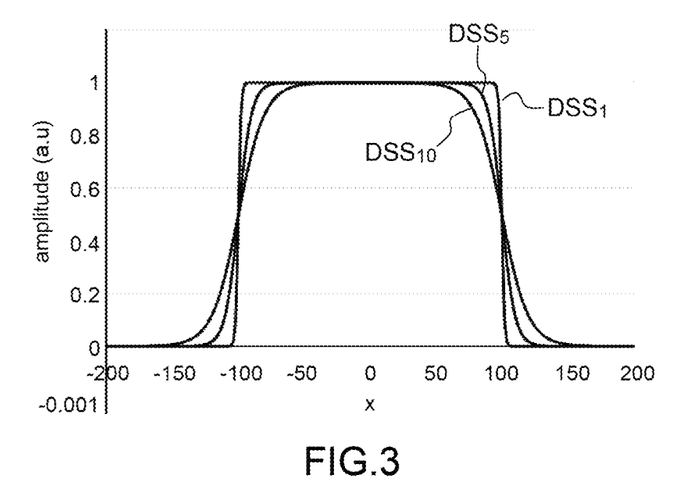
FIG. 3, graphs of three symmetric one-dimensional double sigmoid functions characterized by different steepness parameters.

FIG. 3 shows graphs of three symmetric double sigmoid curves with $x_0=100$ and $k=1$ (curve $DSS_1$), $k=5$ (curve $DSS_5$) and $k=10$ (curve $DSS_{10}$). For small k, this function tends toward a "rectangle" or "top-hat" function, and, as k increases, becomes increasingly rounded so as to tend towards a bell shape for high k. The full width at half-maximum of the rectangle does not depend on k, but is equal to $2x_0$. In contrast, functions defining "bell" curves (Gaussian, Voigt function, etc.) have a full width at half-maximum that is related to the steepness of their slopes.

The invention proposes to use, as PSF, a two-dimensional double sigmoid function, and preferably a symmetric two-dimensional double sigmoid function that may be defined by the following equation:

$$DSS2D(x) = \left[\frac{1}{1+e^{-(x+x_0)/k_x}} - \frac{1}{1+e^{-(x-x_0)/k_x}}\right] \cdot \left[\frac{1}{1+e^{-(y+y_0)/k_y}} - \frac{1}{1+e^{-(y-y_0)/k_y}}\right] \quad (4)$$

Figure 4:
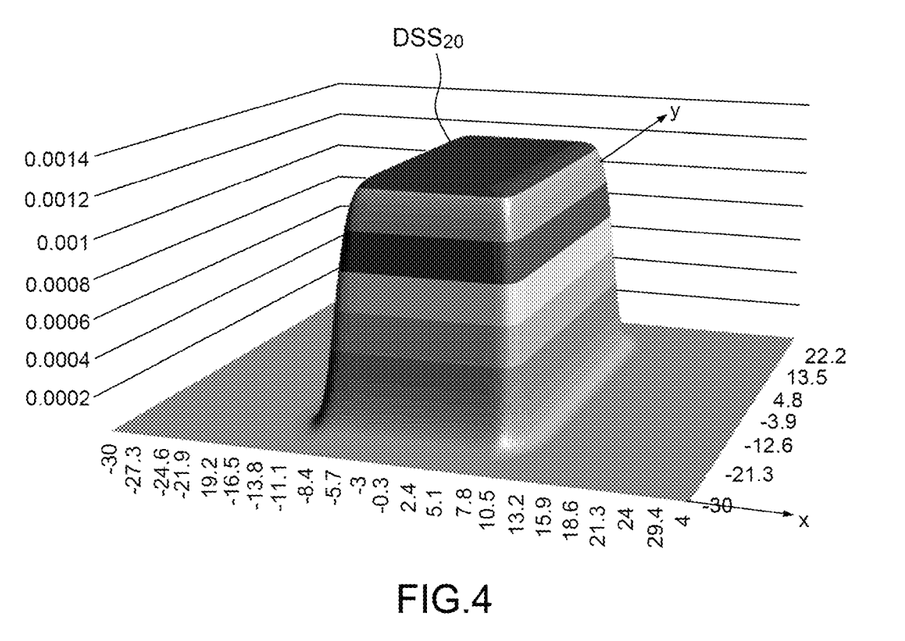
FIG. 4, graph of a symmetric two-dimensional sigmoid function.

FIG. 4 shows the graph DSS2D of a symmetric two-dimensional double sigmoid function with: $x_0=10$, $k_x=0.5$, $y_0=20$, $k_y=1$.

In certain cases, it will possibly be useful to consider an asymmetric two-dimensional double sigmoid function that may be defined by:

$$DSS2D(x) = \left[\frac{1}{1+e^{-(x+x_0)/k_{x,1}}} - \frac{1}{1+e^{-(x-x_0)/k_{x,2}}}\right] \cdot \left[\frac{1}{1+e^{-(y+y_0)/k_{y,1}}} - \frac{1}{1+e^{-(y-y_0)/k_{y,2}}}\right]$$

where $k_{x,1} \neq k_{x,2}$ and/or $k_{y,1} \neq k_{y,2}$.

This generalization allows an asymmetry—which is most often undesired—in the source of the electron beam to be taken into account. Implementation thereof represents no particular difficulty and therefore, below, only the symmetric case will be considered.

Furthermore, below, for the sake of simplicity, the case of a symmetric one-dimensional double sigmoid function (equation 3) will be considered, even though a physical PSF is necessarily two-dimensional.

According to the invention, it is assumed that the dose deposited in the resist 12 by the beam 21 follows a profile that is identical to the intensity profile of the beam, which is given by a symmetric double sigmoid function that is centered on the point $x=0$. The expression of the dose D deposited at the point x is:

$$D(x) = D \cdot \left[\frac{1}{1+e^{-(x+x_0)/k}} - \frac{1}{1+e^{-(x-x_0)/k}}\right] \quad (5)$$

Furthermore, the resist 12 will be considered to be exposed when $D(x) \geq D_0$, and not exposed elsewhere.

Figure 5:
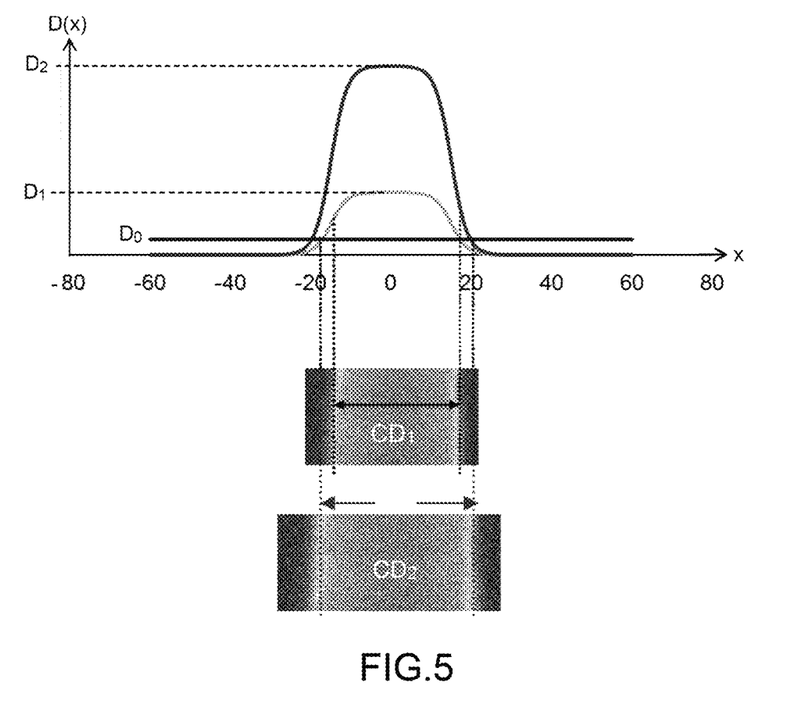
FIGS. 5 and 6, the implementation of a calibrating step of a method according to one embodiment of the invention.

Under these conditions, it is possible to measure the parameters $x_0$ and k experimentally (more precisely: to determine experimentally the best values of $x_0$ and k, such that expression (5) fits, as closely as possible, in the sense of error variance, the actual profile of the electron beam). To do this, the beam is projected onto the resist with various dose values D, and the critical dimension (width) of the pattern thus transferred to the resist is measured. This is illustrated in FIG. 5, in which $D_1$ and $D_2$ are two dose values ($D_1 < D_2$) and $CD_1$, $CD_2$ the corresponding critical dimensions ($CD_1 < CD_2$).

It will easily be understood that, if the values of the parameters $x_0$ and k of the profile (5) were known, the critical width CD of the pattern obtained with a dose D could be calculated by solving, with respect to x, the equation:

$$(x) = D \cdot \left[\frac{1}{1+e^{-(x+x_0)/k}} - \frac{1}{1+e^{-(x-x_0)/k}}\right] = D_0 \quad (6)$$

and by setting: $CD=2x$.

It is found that:

$$\frac{CD}{2} = x_0 + k \cdot \ln\left(-\frac{D_0 - D}{D_0}\right) \quad (7)$$

In other words, there is a linear relationship between CD and $$\xi = \ln\left(-\frac{D_0 - D}{D_0}\right).$$

Figure 6:
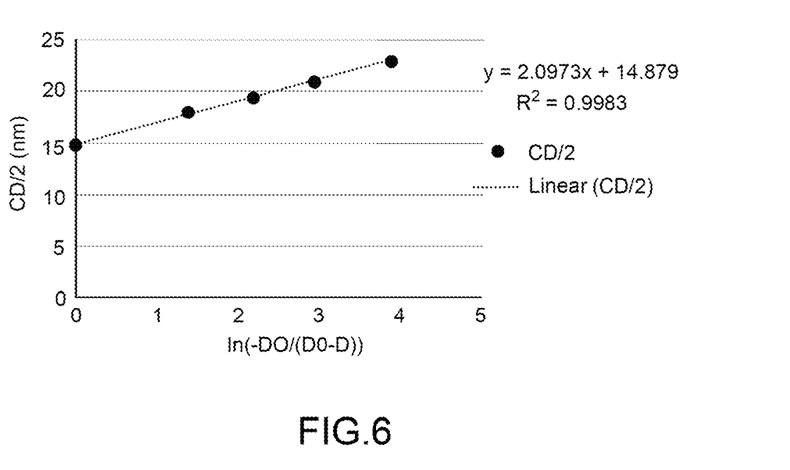

Thus, to estimate the parameters k and $x_0$ it is enough to measure the critical dimensions $CD_i$ for various values $D_i$ of the dose, and therefore for various values of $\xi$, then to perform a linear regression, as is illustrated in FIG. 6. It is preferable to use relatively small dose values $D_i$, such that backscattering is insignificant. Specifically, a symmetric-double-sigmoid-function PSF mainly takes into account forward-scattering effects, which dominate when the intention is to produce patterns of nanoscale size.

Instead of determining the parameters k and $x_0$ experimentally, precise numerical simulations, for example of Monte-Carlo type, will possibly be used.

According to one variant of the invention, the PSF may be expressed by a linear combination of a plurality of functions, at least one of which is a double sigmoid function. The coefficients of the linear combination and the various parameters characterizing these functions may be determined by regression, in general non-linear regression.

Figure 7:
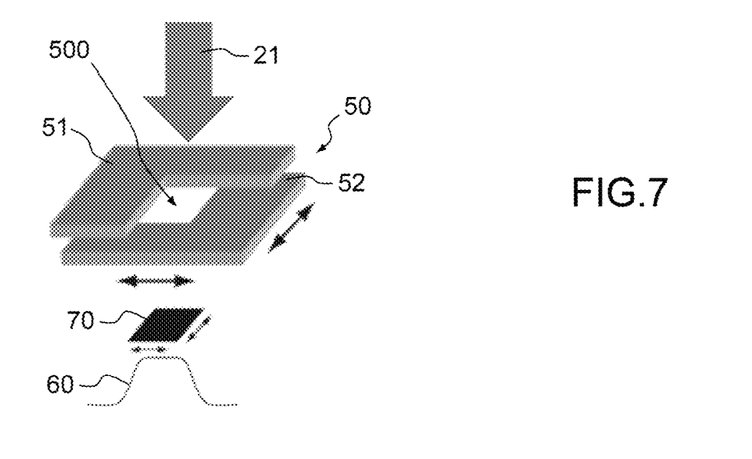
FIG. 7, the implementation of an electron beam.

FIG. 7 illustrates the implementation of an electron beam 21 by means of a diaphragm 50, formed by two metal shields 51, 52 of "L" shape. Moving these two shields with respect to each other makes the shape (square or a rectangle of greater or lesser elongation) and size of the aperture 500 through which the beam passes change. The profile 60 of the beam, measured at the surface of the substrate 10, has a shape that may more easily be approximated by a symmetric double sigmoid function than by a Gaussian, in particular when the cross section of the beam reaches the limiting dimensions of the e-beam lithography apparatus, typically 20 nm to 50 nm. The reference 70 designates the pattern transferred to the resist 12 by the beam 21 shaped by the diaphragm 50.

There are diaphragms allowing beams of shape other than rectangular, for example circular or triangular, to be produced.

Generally, the dose profile deposited in the resist may be defined as the product of convolution of a function defining the desired pattern (for example, a succession of crenels) and the PSF. This dose profile is converted into an exposure pattern by a specific transfer function of the resist, which may for example be a simple threshold function.

FIGS. 8A to 9D allow the results of simulations of transfer of patterns to a resist using a Gaussian PSF (curve G in FIG. 8A) and a symmetric-double-sigmoid-function PSF (curve DSS) to be compared.

Figure 8A:
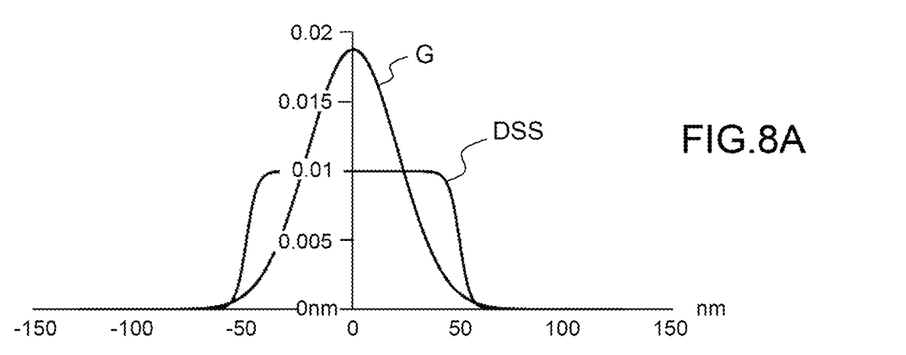
FIGS. 8A-8C and 9A-9D, graphs illustrating a technical effect of the invention.
Figure 8B:
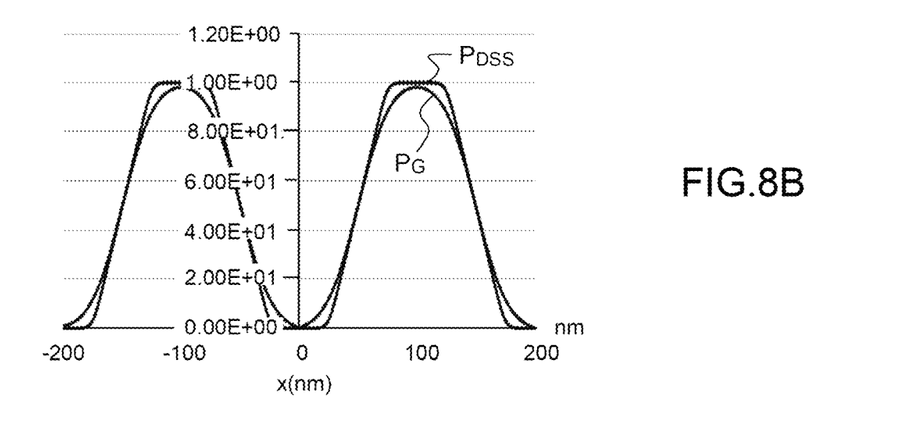

The case of the transfer of a periodic pattern made up of crenels of width equal to 100 nm and of 200 nm period is considered. The curves $P_G$ and $P_{DSS}$ in FIG. 8B show the deposited-dose profiles obtained by convoluting the G and DSS PSFs with this periodic pattern, respectively. The curves are different near their maxima, but have a comparable full width at half-maximum of 50 nm. The Gaussian function is characterized by a dispersion $\sigma=21.23$ nm, whereas the symmetric double sigmoid function is defined by $x_0=50$ nm and $k=2.5$.

Figure 8C:
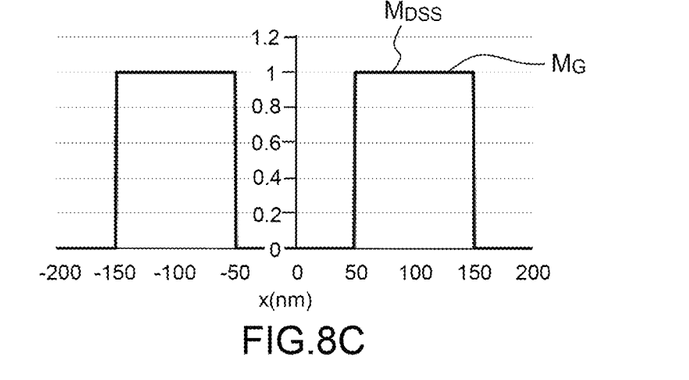
Figure 9A:
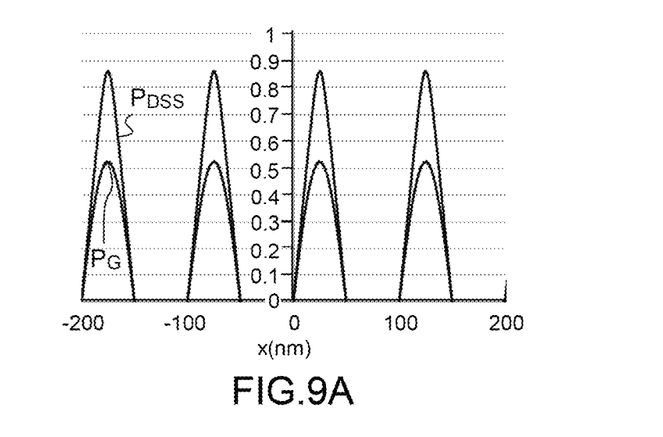
Figure 9B:
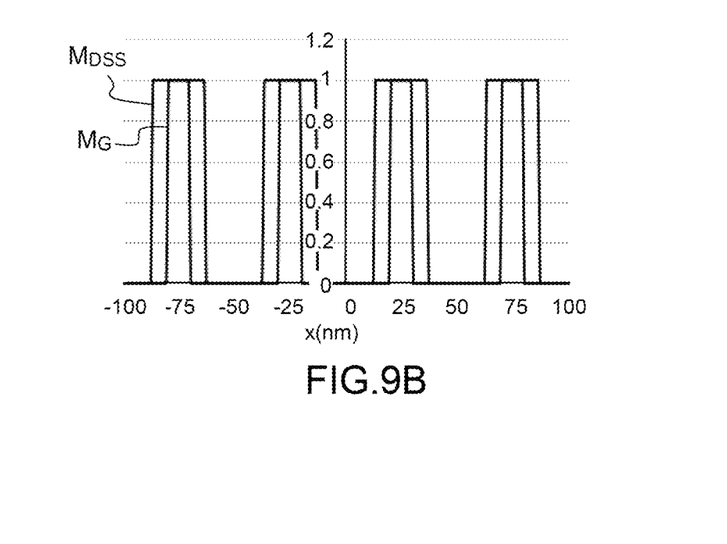
Figure 9C:
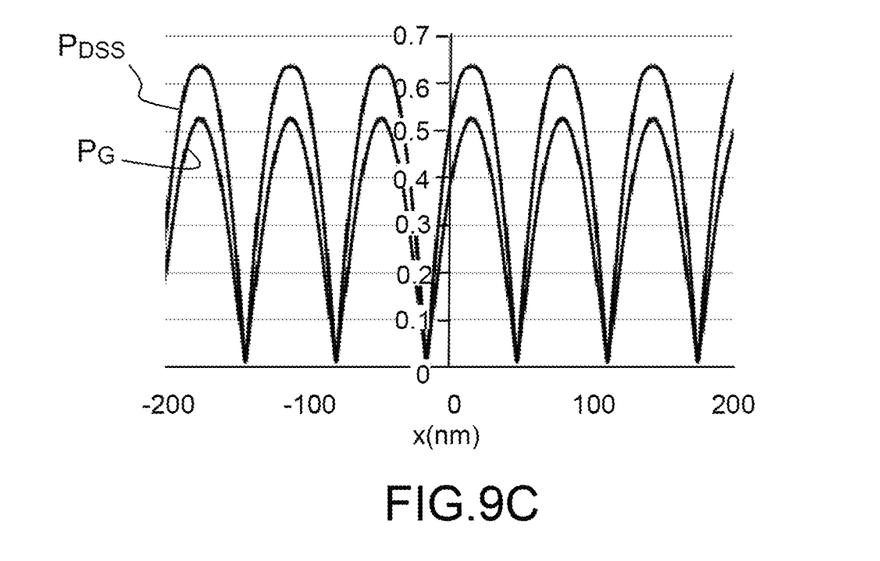
Figure 9D:
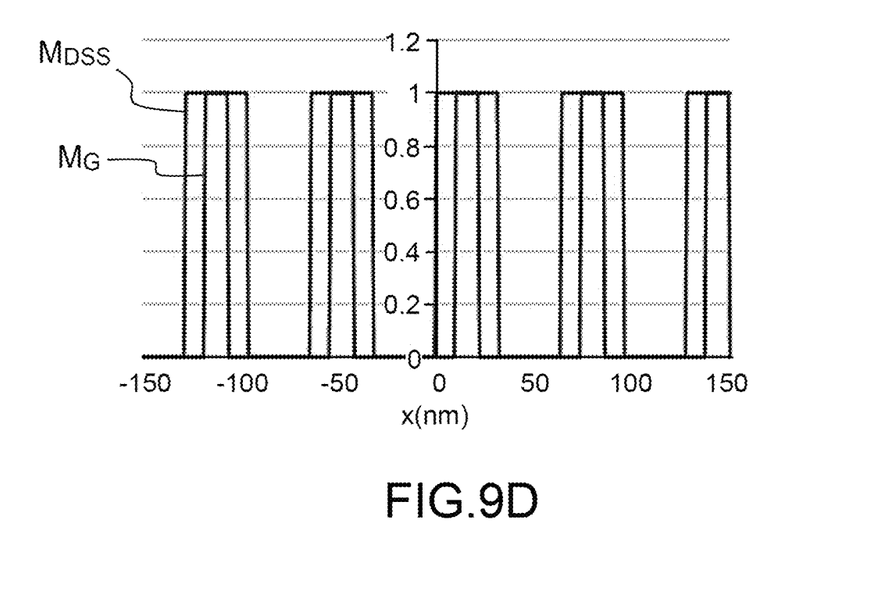

FIG. 8C shows the patterns $M_G$ and $M_{DSS}$ actually transferred to the resist for a threshold equal to 0.5 (arbitrary units). In this case, these patterns are practically identical, and are actually coincident in the figure. This ceases to be true for patterns of smaller critical dimensions. FIGS. 9A/9B relate to the case of a pattern made up of crenels of width equal to 50 nm and of 100 nm period, and FIGS. 9C/9D to the case of a pattern of the same type but of width equal to 32 nm and of 64 nm period. In both cases, the pattern computed using a symmetric-double-sigmoid-function PSF is narrower than the pattern obtained with a Gaussian PSF. It is moreover known that the use of a Gaussian PSF leads to an overestimation of the width of the patterns, and makes corrections necessary: decrease of the dose or of the critical dimensions of the patterns to be transferred. This is no longer necessary if a symmetric-double-sigmoid-function PSF is used. Correction of proximity effects is facilitated thereby.

Moreover, it is possible to show that a symmetric double sigmoid function allows, with a very small error, a Gaussian function to be approached, whereas the inverse is not true. Thus, the use of a double sigmoid function allows the true dose profile to be approached at least as well as, and generally better than, with a Gaussian PSF.

Thus, a symmetric-double-sigmoid-function PSF (or a PSF expressed by a linear combination of functions including at least one symmetric double sigmoid function and, for example, a Gaussian describing backscattering) improves the description of the intensity profile of a shaped beam, decreasing the error in correction of proximity effects with respect to use of a Gaussian function. This is at least partially explained by the fact that the width of the curve described by such a function (defined by the parameter $x_0$) may be adjusted independently of the steepness of its edges (defined by the parameter k).

Moreover, sigmoid functions—in particular sigmoid functions of the logistic type—have analytical expressions that are easy to integrate into numerical simulation tools; the same goes for symmetric double sigmoid functions. Since their cumulative distribution functions are also analytical, the convolution computations used for the correction of proximity effects have a complexity and a consumption in terms of computational power that are comparable to those of the prior art.

Moreover, a plurality of PSFs comprising symmetric double sigmoid functions, corresponding to the various beam geometries, pattern sizes and other working conditions achievable with a given piece of shaped-beam lithography equipment, will possibly be determined, in the way described above with reference to FIG. 5.

Another advantage of the invention resides in the simplification of the proximity-effect-correcting process. Known prior-art software packages (for example PROXECCO (registered trademark), or INSCALE (registered trademark)) are able to combine, to optimize geometry, a dose modulation and a modulation of the geometry of the patterns to be exposed, as is described in patent application EP 2 650 902. When the forward scattering of electrons is described by symmetric double sigmoid functions, only a dose modulation is necessary, this simplifying and decreasing the time taken to perform the associated computations.

To implement embodiments of the invention in shaped-beam e-beam lithography, it is possible to use an e-beam lithography machine of known type, for example the Vistec SB 3054. Dose-modulation corrections according to the invention will possibly be integrated into commercially available software packages such as PROXECCO (registered trademark), which is distributed by Synopsis, or INSCALE (registered trademark), which is distributed by Aselta Nanographics, or even BEAMER (registered trademark), which is distributed by GeniSys, in order to replace the forward-scattering PSFs of the prior art (Gaussian functions or combinations thereof) with the double-sigmoid PSF described above. For the backscattering PSF, the same functions as in the prior art will possibly be used, i.e. essentially Gaussians or combinations of Gaussians.

The invention has mainly been described with respect to its application to e-beam lithography. However, it may also be applied to lithography processes using beams of particles other than electrons, and even to processes, in which a beam of particles interacts with a target, other than lithography processes. It may in particular be applied to electron microscopy.

The invention claimed is:

1. A method for projecting a particle beam onto a substrate, said method comprising:
    a step of calculating a correction of scattering effects of said particle beam by means of a point spread function modelling forward scattering effects of particles;
    a step of modifying a dose profile of said particle beam, implementing the correction thus calculated; and
    a step of projecting the particle beam, the dose profile of which has been modified, onto said substrate, and wherein said point spread function comprises one of the following: a two-dimensional double sigmoid function or a linear combination of functions at least one of which comprises a two-dimensional double sigmoid function.

2. The method as claimed in claim 1, wherein said two-dimensional double sigmoid function is defined in a plane XY and is expressed by a product of two one-dimensional double sigmoid functions defined on two orthogonal axes X and Y of said plane.

3. The method as claimed in claim 2, wherein each said one-dimensional double sigmoid function is expressed by a difference between two one-dimensional sigmoid functions, having an offset along an axis.

4. The method as claimed in claim 3, wherein each said one-dimensional double sigmoid function comprises a logistic function.

5. The method as claimed in claim 3, wherein each said one-dimensional double sigmoid function is symmetric and expressed by a difference between two identical one-dimensional sigmoid functions having an offset along said axis.

6. The method as claimed in claim 1, comprising a step of calibrating by determining a set of geometric parameters of said two-dimensional double sigmoid function, said calibrating step comprising the following substeps:
- a) projecting said particle beam onto a substrate having an exposure threshold Do of exposure to the particle beam;
- b) measuring at least one dimension $CD_i$ of a region, of the substrate, in which said exposure threshold was exceeded;

these substeps being repeated a plurality of times, identified by an index i, for various values $D_i$ of exposure dose; and

- c) determining said set of geometric parameters on a basis of the measured dimensions;

wherein the substeps a) and b) being implemented experimentally or by means of numerical simulations.

7. The method as claimed in claim 6, wherein:

$CD_i$ is a width of said region of the substrate in a direction x, acquired in an i-th repetition of substeps a) and b); and said substep c) comprises calculating a linear function of expression $CD_i = 2k \cdot \xi_i + 2x_0$, by regression based on the measurements of width $CD_i$ carried out in the various repetitions of said substep b), where $\xi_i = \ln[-D_0/(D_0-D_i)]$, k and $x_0$ being said geometric parameters of said two-dimensional double sigmoid function.

8. A method according to claim 1 wherein the particle beam is an electron beam and a resist that is sensitive to irradiation by the electron beam and that is deposited on a surface of the substrate, the method further comprising a development step for selective removing of regions of the resist depending on a dose deposited by the electron beam.

\* \* \* \* \*